US012563576B2

(12) United States Patent
Shilo et al.

(10) Patent No.: US 12,563,576 B2
(45) Date of Patent: Feb. 24, 2026

(54) TRIGGERING BEAMFORMED UP LINK PHYSICAL LAYER PROTOCOL DATA UNITS

(71) Applicant: Huawei Technologies Co., Ltd., Shenzhen (CN)

(72) Inventors: Shimon Shilo, Hod Hasharon (IL); Genadiy Tsodik, Hod Hasharon (IL); Avner Epstein, Hod Hasharon (IL); Arik Klein, Hod Hasharon (IL); Yaron Ben-Arie, Hod Hasharon (IL); Doron Ezri, Hod Hasharon (IL)

(73) Assignee: Huawei Technologies Co., Ltd., Shenzhen (CN)

( * ) Notice: Subject to any disclaimer, the term of this patent is extended or adjusted under 35 U.S.C. 154(b) by 328 days.

(21) Appl. No.: 18/192,435

(22) Filed: Mar. 29, 2023

(65) Prior Publication Data

US 2023/0319851 A1 Oct. 5, 2023

Related U.S. Application Data

(63) Continuation of application No. PCT/EP2020/077322, filed on Sep. 30, 2020.

(51) Int. Cl.
H04W 4/00 (2018.01)
H04B 7/06 (2006.01)
(Continued)

(52) U.S. Cl.
CPC .......... H04W 72/27 (2023.01); H04B 7/0617 (2013.01); H04L 1/1621 (2013.01);
(Continued)

(58) Field of Classification Search
CPC ..... H04W 72/27; H04W 88/08; H04W 74/06; H04W 84/12; H04B 7/0617;
(Continued)

(56) References Cited

U.S. PATENT DOCUMENTS 12,177,154 B2 * 12/2024 Vermani ............... H04L 5/0094
2016/0100396 A1 4/2016 Seok
(Continued)

FOREIGN PATENT DOCUMENTS

CA 2887647 A1 * 4/2014 ........ H04W 74/0816
EP 3618376 A1 * 3/2020 ............ H04W 74/06
(Continued)

OTHER PUBLICATIONS 802.11-2016, Part 11: Wireless LAN Medium Access Control (MAC) and Physical Layer (PHY) Specifications, Dec. 7, 2016, total 3534 pages.
(Continued)

*Primary Examiner* — Thai Dinh Hoang
(74) *Attorney, Agent, or Firm* — Slater Matsil, LLP

(57) ABSTRACT

A system and method for triggering beamformed uplink (UL) physical layer protocol data units (PPDUs) are disclosed. The system comprises an access point (AP) and one or more stations (STAs). The AP sends a soliciting frame to the one or more STAs, wherein the frame comprises a null data packet, NDP, request, NDPR, indicator and receive an NDP PPDU from each of the one or more solicited STAs. The AP, then computes the precoder for each of the one or more solicited STAs and send the one or more solicited STA a trigger frame with a beamforming report. The AP receives from each of the STAs one or more beamformed UL data packets and sends a block acknowledgement to the one or more solicited STAs indicating the successful receipt of the one or more beamformed UL data packets.

20 Claims, 18 Drawing Sheets

(51) Int. Cl.

| | |
|---|---|
| *H04L 1/1607* | (2023.01) |
| *H04L 5/00* | (2006.01) |
| *H04W 72/27* | (2023.01) |
| *H04B 7/0452* | (2017.01) |
| *H04W 88/08* | (2009.01) |

(52) U.S. Cl.
CPC .......... *H04L 5/0044* (2013.01); *H04L 5/0053* (2013.01); *H04B 7/0452* (2013.01); *H04L 5/0007* (2013.01); *H04W 88/08* (2013.01)

(58) Field of Classification Search
CPC ... H04B 7/0452; H04B 7/0619; H04L 1/1621; H04L 5/0044; H04L 5/0053; H04L 5/0007
See application file for complete search history.

(56) References Cited

U.S. PATENT DOCUMENTS

| | | | | |
|---|---|---|---|---|
| 2016/0330732 | A1 | 11/2016 | Moon et al. | |
| 2020/0314220 | A1* | 10/2020 | Segev | G01S 13/765 |
| 2021/0234947 | A1* | 7/2021 | Segev | H04B 7/0413 |
| 2023/0141111 | A1* | 5/2023 | Ciochina | H04B 7/0617 |
| | | | | 375/267 |

FOREIGN PATENT DOCUMENTS

| | | | | |
|---|---|---|---|---|
| WO | 2020094098 A1 | | 5/2020 | |
| WO | WO-2021209233 A1 * | | 10/2021 | .......... H04B 7/0626 |
| WO | WO-2022069027 A1 * | | 4/2022 | .......... H04B 7/0452 |

OTHER PUBLICATIONS

IEEE Std 802.11ac™-2013, Part 11: Wireless LAN Medium Access Control (MAC) and Physical Layer (PHY) Specifications, Amendment 4: Enhancements for Very High Throughput for Operation in Bands below 6 GHz, Dec. 11, 2013, total 425 pages.

IEEE Std 802.11n™-2009, Part 11: Wireless LAN Medium Access Control (MAC) and Physical Layer (PHY) specifications, Amendment 5: Enhancements for Higher Throughput, Oct. 29, 2009, total 536 pages.

IEEE P802.11ax™/D6.0, Part 11: Wireless LAN Medium Access Control(MAC) and Physical Layer (PHY) Specifications, Amendment 1: Enhancements for High Efficiency WLAN, Nov. 2019, total 780 pages.

* cited by examiner

| Field Name | Size | Values |
|---|---|---|
| NDPR | 1bit | 0: EHT NDP Announcement<br>1: EHT NDP Request |
| BW | 3bit | 0: 20MHz<br>1: 40MHz<br>2: 80MHz<br>3: 160MHz<br>4: 240MHz<br>5: 320MHz<br>6..7: reserved |
| Nr | 4bit | 0..15: 1 to 16SS |
| AID | 11bit | STA Address |
| Disambiguity | ≥ 1bit | |

FIG. 5b

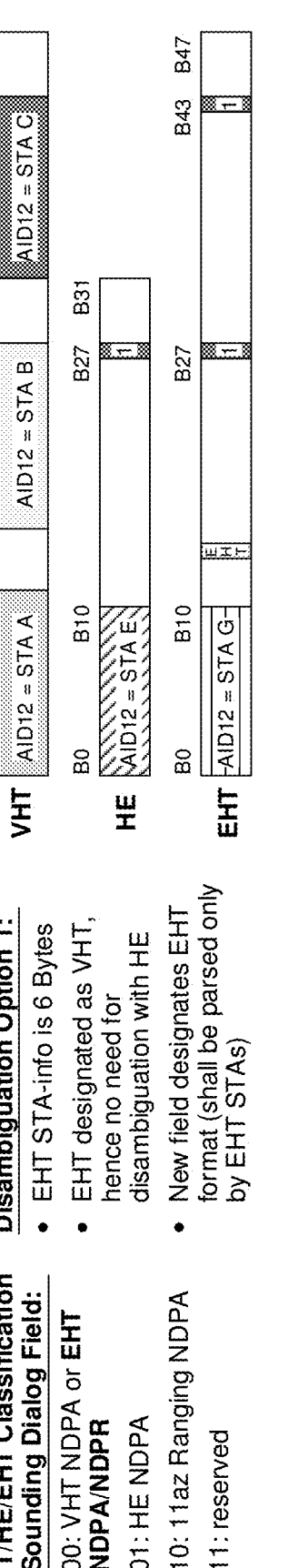
FIG. 5c1
VHT/HE/EHT Classification in Sounding Dialog Field:
- 00: VHT NDPA or EHT NDPA/NDPR
- 01: HE NDPA
- 10: 11az Ranging NDPA
- 11: reserved
Disambiguation Option 1:
- EHT STA-info is 6 Bytes
- EHT designated as VHT, hence no need for disambiguation with HE
- New field designates EHT format (shall be parsed only by EHT STAs)

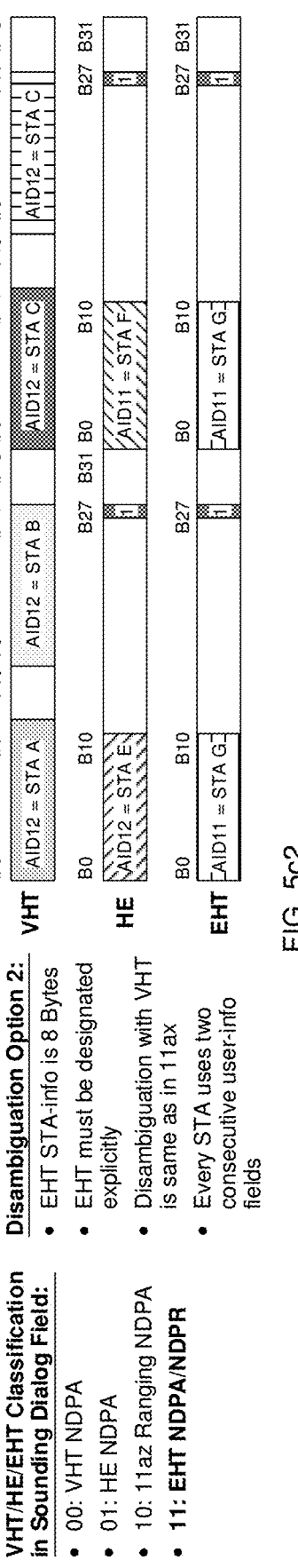
FIG. 5c2

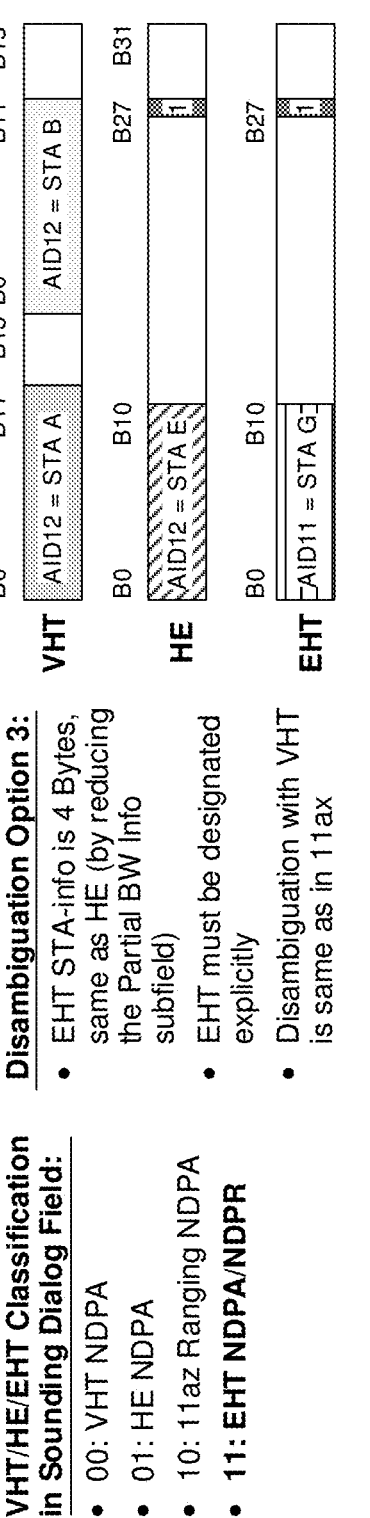
FIG. 5c3

| Basic Trigger Frame | | | Aggregated NB BFR (Action No ACK) |
| --- | --- | --- | --- |
| Compressed BFR Present | Compressed BFR Type | Compressed WB BFR | |
| 0 | Not exist | Not exist | Not exist |
| 1 | Exist (8bit) ==1 | Exist (size according to NrxNc) | Not exist |
| 1 | Exist (8bit) ==0 | Not exist | Exist according to standard frame format |

FIG. 9

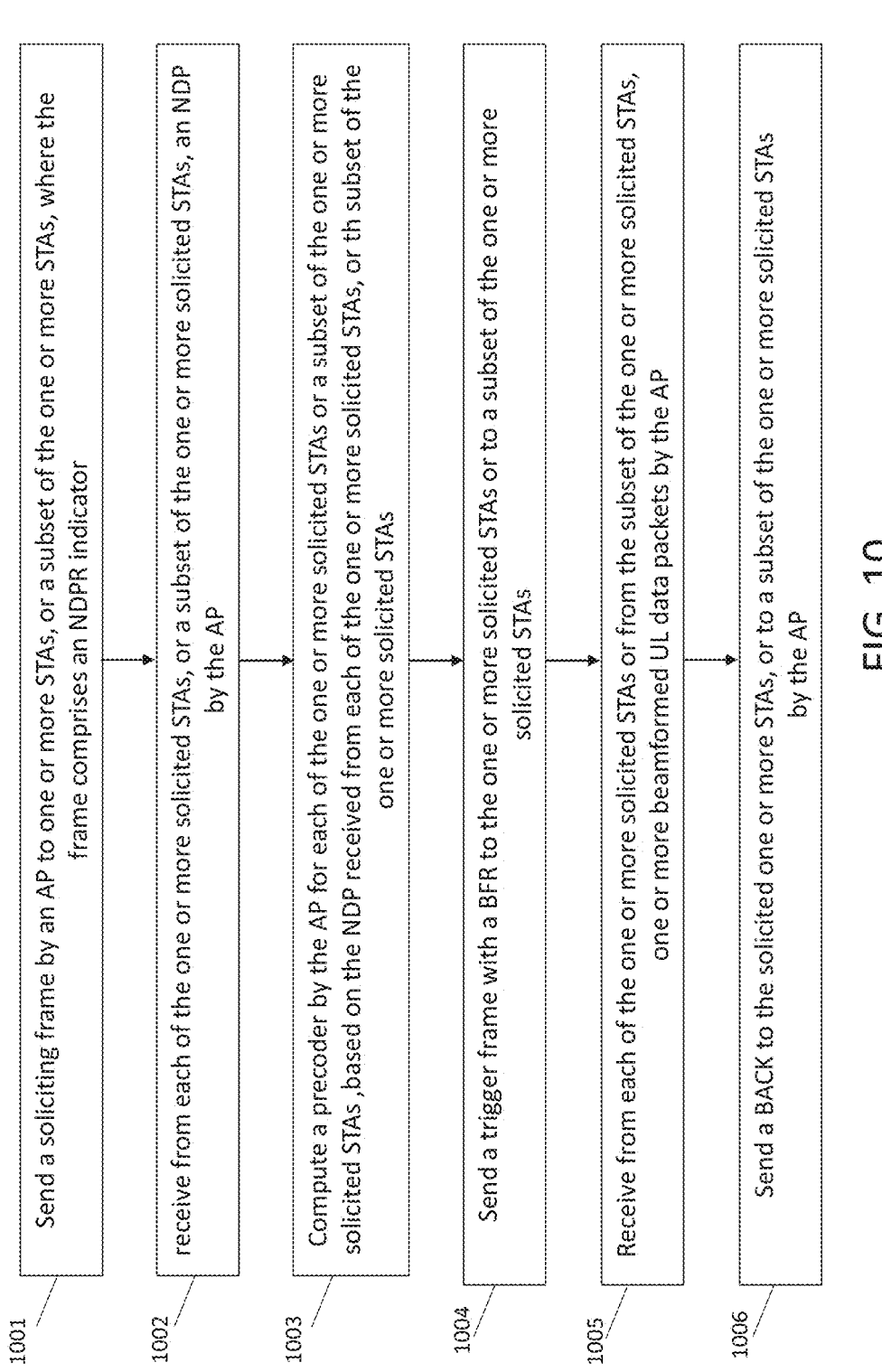

FIG. 10

1001   Send a soliciting frame by an AP to one or more STAs, or a subset of the one or more STAs, where the frame comprises an NDPR indicator 1002   receive from each of the one or more solicited STAs, or a subset of the one or more solicited STAs, an NDP by the AP 1003   Compute a precoder by the AP for each of the one or more solicited STAs or a subset of the one or more solicited STAs, based on the NDP received from each of the one or more solicited STAs, or th subset of the one or more solicited STAs 1004   Send a trigger frame with a BFR to the one or more solicited STAs or to a subset of the one or more solicited STAs 1005   Receive from each of the one or more solicited STAs or from the subset of the one or more solicited STAs, one or more beamformed UL data packets by the AP 1006   Send a BACK to the solicited one or more STAs, or to a subset of the one or more solicited STAs by the AP

| Scenario | | | Complex Mults | |
| --- | --- | --- | --- | --- |
| N_Tx | BW [MHz] | N_Tones | NB | WB |
| 2 | 20 | 60 | 7680 | 364 |
| 2 | 80 | 250 | 32000 | 1124 |
| 4 | 20 | 60 | 55680 | 2816 |
| 4 | 80 | 250 | 232000 | 8896 |

FIG. 13

TRIGGERING BEAMFORMED UP LINK PHYSICAL LAYER PROTOCOL DATA UNITS

CROSS-REFERENCE TO RELATED APPLICATIONS

This application is a continuation of International Application No. PCT/EP2020/077322, filed on Sep. 30, 2020, the disclosure of which is hereby incorporated by reference in its entirety.

TECHNICAL FIELD

The present disclosure, in some embodiments thereof, relates to wireless communication systems and, more specifically, but not exclusively, to a system and method for triggering beamforming uplink (UL) physical layer protocol data units (PPDUs).

BACKGROUND

In wireless communication systems, an access point (AP) is a networking hardware device, which allows other wireless terminal stations (STAs), typically client devices, to connect with a wired network. Examples for STAs may be cell phones, laptops and the like. The AP usually connects to a router as a stand-alone device, but it may be an integral component of the router itself. The AP connects directly to a wired local area network (LAN), and then provides a wireless connections using wireless technology, typically Wi-Fi, for other STAs to use the wired connection.

When relating to global system for mobile communication (GSM) the terminology of uplink refers to the transmission path from the STA to the AP. Downlink is the transmission path from the AP to the STAs.

Beamforming is a technique by which an array of antennas can be steered to transmit radio signals in a specific direction. Rather than simply broadcasting energy and/or signals in all directions, the antenna arrays that use beamforming, determine the direction of interest and send and/or receive a stronger beam of signals in the determined specific direction.

The beamforming technique is widely used in radars and sonar, biomedical, and particularly in communications (telecom, Wi-Fi), especially, in the fourth generation (4G) and fifth generation (5G)—where very high data rates are required and the only way to support this would be to maximize transmit and receive efficiency by using beamforming.

In the beamforming technique, each antenna element is fed separately with the signal to be transmitted. The phase and amplitude of each signal is then added constructively and destructively in such a way that they concentrate the energy into a narrow beam or lobe. Digital beamforming is a technique whereby symbols to be transmitted are precoded (modified in both amplitude and phase) in baseband processing before conversion to RF.

SUMMARY

It is an object of the present disclosure to provide a system and a method for triggering beamforming uplink (UL) physical layer (PHY) protocol data units (PPDUs). Thereby increasing throughput and performances of UL PPDUs transmissions.

The foregoing and other objects are achieved by the features of the independent claims. Further implementation forms are apparent from the dependent claims, the description and the figures.

According to a first aspect of the present disclosure, an access point, AP, communication device is disclosed. The AP comprises a transceiver configured to send a soliciting frame to one or more stations, STAs, wherein the frame comprises a null data packet, NDP, request, NDPR, indicator; and to receive an NDP physical layer (PHY) protocol data units (PPDU) from each of the one or more solicited STAs.

According to a second aspect of the present disclosure, a station, STA, is disclosed. The STA comprises a transceiver configured to: receive a soliciting frame from an access point, AP, wherein the frame comprises a null data packet, NDP, request, NDPR, indicator; and send an NDP physical layer (PHY) protocol data units (PPDUs) to the AP.

According to a third aspect of the present disclosure, a method for receiving triggered beamforming up link (UL) physical layer protocol data units (PPDUs), is disclosed. The method comprises: sending a soliciting frame by an access point, AP, communication device to one or more stations, STAs, wherein the frame comprises a null data packet, NDP, request, NDPR, indicator; and receiving an NDP PPDU from each of the solicited one or more STAs.

According to a fourth aspect of the present disclosure, a method for transmitting triggered beamforming up link (UL) physical layer protocol data units (PPDUs), is disclosed. The method comprises: receiving a soliciting frame from an access point, AP, wherein the frame comprises a null data packet, NDP, request, NDPR, indicator; and sending an NDP PPDU to the AP.

In a further implementation of the first and second aspect, the frame comprises NDPR frame or NDPR Trigger Frame, TF.

In a further implementation of the first aspect, the AP communication device is further configured to: transmit the NDPR frame to one STA; receive an NDP PPDU from the one STA; and repeat the transmission of the of the NDPR frame and reception of NDP PPDU to STAs in a sequential manner.

In a further implementation of the first aspect, the NDP PPDU received from the solicited STAs comprises one of multiplexing of: UL orthogonal frequency division multiplexing access (OFDMA), UL multi user multiple input multiple output (MU-MIMO), a combination of OFDMA and MU-MIMO.

In a further implementation of the first aspect, the transceiver is further configured to compute a precoder for an uplink (UL) data packet transmission based on the received NDP PPDU(s) from the solicited STAs.

In a further implementation of the first aspect, the transceiver is further configured to transmit a beamforming report to the one or more solicited STAs, or to a subset of the one or more solicited STAs, wherein the beamforming report is contained in a TF soliciting UL data or the beamforming report is transmitted with the TF soliciting UL data, in a same PPDU.

In a further implementation of the first aspect, the transceiver is further configured to receive from each of the one or more solicited STAs, or subset of the one or more solicited STAs UL data packets, which are beamformed according to the beamforming report, in response to the TF soliciting UL data.

In a further implementation of the first aspect, the transceiver is further configured to send a block acknowledgement (BACK) to the one or more solicited STAs, or subset of one or more solicited STAs in response to receiving the UL data packets which are beamformed from the one or more solicited STAs, or subset of solicited one or more STAs.

In a further implementation of the first aspect, the one or more UL data packets received from the one or more solicited STAs, or subset of one or more solicited STAs, comprises an indication signal, which indicates that the one or more UL data packets are beamformed.

In a further implementation of the first and second aspects, the beamforming report comprises narrowband and/or wideband precoding.

In a further implementation of the first aspect, the transceiver is further configured to send an NDPR, which comprises a sub type field and a STA Info field which comprise information that enables disambiguation between the frame formats of very high throughput (VHT), high efficiency (HE) and extremely high throughput (EHT).

In a further implementation of the first and second aspects, the beamforming report comprises a minimum size of resource allocation of 242 tones for wideband precoding, to support the UL beamforming.

In a further implementation of the first and second aspects, the beamforming report comprises a compressed narrowband beamforming report bit and/or a compressed wideband beamforming report bit.

In a further implementation of the first and second aspects, the wideband beamforming report is given in a resolution of 20 MHz.

In a further implementation of the second aspect, the NDP PPDUs comprises one of multiplexing of: UL orthogonal frequency division multiplexing access (OFDMA), UL multi user multiple input multiple output (MU-MIMO), a combination of OFDMA and MU-MIMO.

In a further implementation of the second aspect, the transceiver is further configured to receive a precoder for an uplink (UL) data packet transmission computed by the AP, based on the NDP PPDU.

In a further implementation of the second aspect, the transceiver is further configured to receive a beamforming report, wherein the beamforming report is contained in a trigger frame soliciting UL data or the beamforming report is transmitted with the trigger frame soliciting UL data, in a same PPDU.

In a further implementation of the second aspect, the transceiver is further configured to send to the AP UL data packets, which are beamformed according to the beamforming report in response to the TF soliciting UL data.

In a further implementation of the second aspect, the transceiver is further configured to receive a block acknowledgement (BACK) from the AP in response to the sent UL data packets which are beamformed.

In a further implementation of the second aspect, the one or more UL data packets sent from the STA, comprises an indication signal, which indicates that the one or more UL data packets are beamformed.

In a further implementation of the second aspect, the transceiver is further configured to receive an NDPR, which comprises a sub type field and a STA Info field which comprise information that enables disambiguation between the frame formats of very high throughput (VHT), high efficiency (HE) and extremely high throughput (EHT).

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

In the drawings.

FIG. 5*b* schematically shows a table, which describes the size and value for the fields of NDPR, BW and Nr, according to some embodiments of the present disclosure;

FIGS. 5*c*1-5*c*3, schematically shows disambiguation options for the sounding dialog field, according to some embodiments of the present disclosure;

FIG. 9 schematically shows a table, which presents how the values of the sub-fields, according to some embodiments of the present disclosure ('Compressed BFR present', 'Compressed BFR type') determine the existence of the WB or NB BFR and whether it is aggregated with the Trigger Frame;

FIG. 10 schematically shows a method for triggering beamformed UL PPDUs, according to some embodiments of the present disclosure;

FIG. 13 schematically shows the complex multiplications required for NB and WB beamforming for specific scenario according to the number of Tx antennas, BW and number of tones, according to some embodiments of the present disclosure.

DETAILED DESCRIPTION OF ILLUSTRATIVE EMBODIMENTS

Figures 1A, 1B:
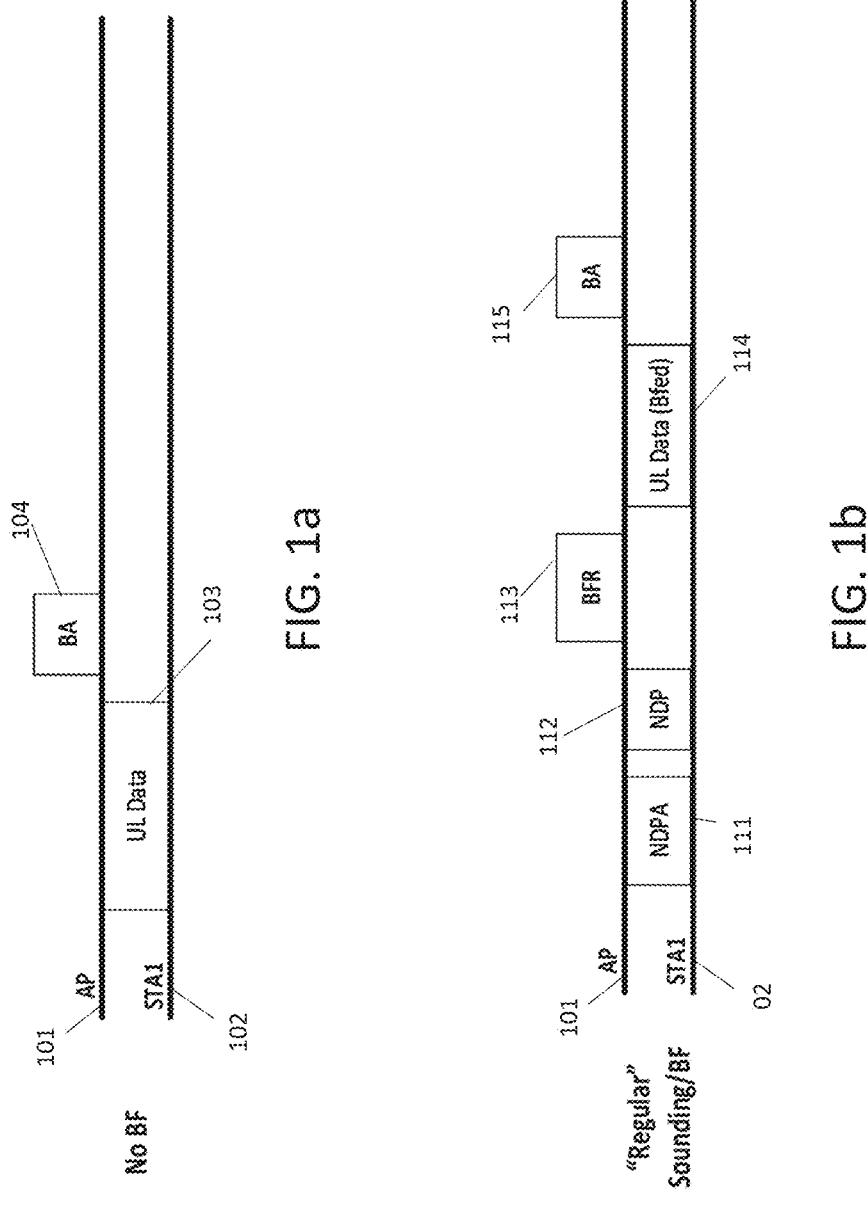
FIG. 1*a* shows a schematic diagram of an uplink single user PPDU (UL SU PPDU) transmission without beamforming.
FIG. 1*b* shows a schematic diagram of an UL SU PPDU transmission with beamforming as supported by IEEE 802.11ax.

The present disclosure, in some embodiments thereof, relates to wireless communication systems and, more specifically, but not exclusively, to a system and method for triggering beamforming up link (UL) physical layer protocol data units (PPDUs). According to some embodiments of the present disclosure, triggering the beamforming in the UL is done by an AP communication device comprising a transceiver, which sends a soliciting frame to one or more STAs. The frame contains a null data packet (NDP) request (NDPR) indicator. Each of the one or more solicited STAs sends in response an NDP PPDU to the AP.

The institute of electrical and electronic engineers (IEEE) 802, is a family of IEEE standards dealing with local area networks and metropolitan area networks. The IEEE 802.11be is a new future technical standard, which copes with the challenge of increasing the throughput and improving efficiency.

Beamforming has been supported since 802.11n. In 802.11n, multiple sounding mechanisms are defined to support Beamforming (BF) operation. Sounding is a technique that enables an AP or a STA to acquire information about the channel (e.g. estimate the channel and compute the precoder). For example, implicit sounding is a technique where uplink signals are used, assuming reciprocity, to determine the beamforming weights or precoders; explicit sounding is a technique where dedicated signals are being transmitted so that the intended receiver, known as the beamformee—computes the precoding weights and informs the intended transmitter, known as the beamformer. In 802.11ac and 802.11ax, explicit sounding is the only mechanism defined to support BF operation. Under the procedure defined in the 802.11ac and 802.11ax standards, the beamformer, which is the intended transmitter of the beamformed information, initiates a channel sounding procedure with a Null Data Packet. The beamformee measures the channel and responds with a beamforming feedback frame, containing a compressed feedback matrix. The beamformer uses this information to compute the channel matrix. The beamformer can then use this channel matrix to focus the RF energy toward each user.

The 802.11ax standard has two modes of operation: Non Trigger-Based mode, which is a sequential mode, where the wireless STAs send and receive data one at a time once they secure access to the medium; and Trigger-Based Mode, which is a mode that allows for simultaneous operation of multiple non-AP STAs. The standard divides this mode further into Downlink (DL) and Uplink (UL) Multi-user.

Downlink multi-user refers to data that the AP serves to multiple associated wireless STAs at the same time. The existing 802.11ac standard already specifies this feature. Uplink multi-user involves simultaneous transmission of data from multiple STAs to the AP. This is a new functionality of the 802.11ax standard, which did not exist in any of the previous versions of the Wi-Fi standard. Another one of the newest features in 802.11ax (compared with earlier 802.11 standards) is the introduction of the Trigger Frame (TF), a frame that instructs the intended receiver, typically a STA, to transmit in response to receiving the TF. A physical layer (PHY) Protocol Data Unit (PPDU), which is transmitted in response to receiving a TF is called a Trigger-Based (TB) PPDU. A STA, which is triggered to transmit in the UL is called a Triggered STA.

Under the Multi-User mode of operation, the standard also specifies two different ways of multiplexing more users within a certain area: Multi-User Multi Input Multi Output (MU MIMO) and Orthogonal Frequency Division Multiple Access (OFDMA). For both of these methods, the AP acts as the central controller of all aspects of multi-user operation. An 802.11ax AP can also combine MU-MIMO with OFDMA operation.

Uplink MU operation is more complicated than Downlink in the sense of synchronization, as each STA transmits an uplink frame at the same time. Each STA should know which resource unit (RU) is allocated to it and these frames should be synchronized physically. In order to ensure alignment of the multiple STAs in terms of time and frequency, UL MU-MIMO STAs are triggered by the AP; in other words, STAs cannot transmit in OFDMA and/or MU-MIMO modes in the uplink without being triggered.

Beamforming is supported for both DL and UL. However, 802.11ax does not support beamforming for trigger-based PPDUs, which are PPDUs transmitted in the UL as a response to an instruction from the AP. This means trigger-based PPDUs cannot utilize beamforming so their performance is limited. Reference is now made to FIGS. 1a-1b. FIG. 1a shows a schematic diagram of an UL SU PPDU transmission without beamforming. In this case, a STA 102 transmits an UL data packet 103 transmission to an AP 101, and the AP returns a block acknowledgement (BA or BACK) to the STA, indicating if the UL data packet (or portions thereof) was successfully decoded. FIG. 1b shows a schematic diagram of an UL SU PPDU transmission with beamforming as supported by the IEEE 802.11ax standard. In this case, beamforming is supported by the STA 102 transmitting a null data packet (NDP) announcement, (NDPA) 11. Throughout the description the term NDP refers to a physical layer (PHY) NDP. An NDPA is a frame which is transmitted before an NDP, indicating the parameters of the beamforming feedback requested from the STA(s) (e.g. which STAs need to respond, what parameters should STAs use, and the like). After the NDPA 11, the STA 102 transmits an NDP 112, followed by a response from the AP 101 with a Beamforming Report (BFR). The BFR is a frame, which carries the beamforming and/or the precoding information, such as precoding vector or matrix, signal to noise ratio (SNR) corresponding to each precoder, and the like. As can be seen from FIGS. 1a and 1b and further explained hereon, in 802.11ax and earlier versions of 802.11 UL beamforming is limited to a PPDU transmitted by a single STA. It is not possible to support beamforming in a high efficiency trigger-based PPDU (HE TB PPDU) for several reasons. First, the AP cannot indicate the STAs (in the preceding TF) to apply beamforming in an UL TB PPDU.

Second, the triggered STAs cannot indicate in an UL TB PPDU that beamforming is being applied. Third, when the sounding procedure is not triggered by the AP (beamformee in this case), how and when do the STAs (in the MU UL) perform sounding? The sounding procedure (triggered by the STA) isn't necessarily carried out prior to the UL beamformed data transmission, and if enough time passed between the sounding procedure and the time when the BFR is applied, the BFR information may not be relevant anymore. Furthermore, efficiency is compromised significantly, as each STA would have to perform the sounding procedure individually, irrespective of the trigger frame.

Therefore, there is a need for a method and system, which enables beamforming in the uplink, in particular supporting it for a Trigger-Based PPDU (since it is not supported yet) for the next 802.11be standard and ensuring it is efficient.

The present disclosure, according to some embodiments thereof, provides a system and method for triggering beamforming UL PPDU by transmitting an NDP request (NDPR) frame from an AP to one or more STAs and receiving in response NDP from each of the STAs.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
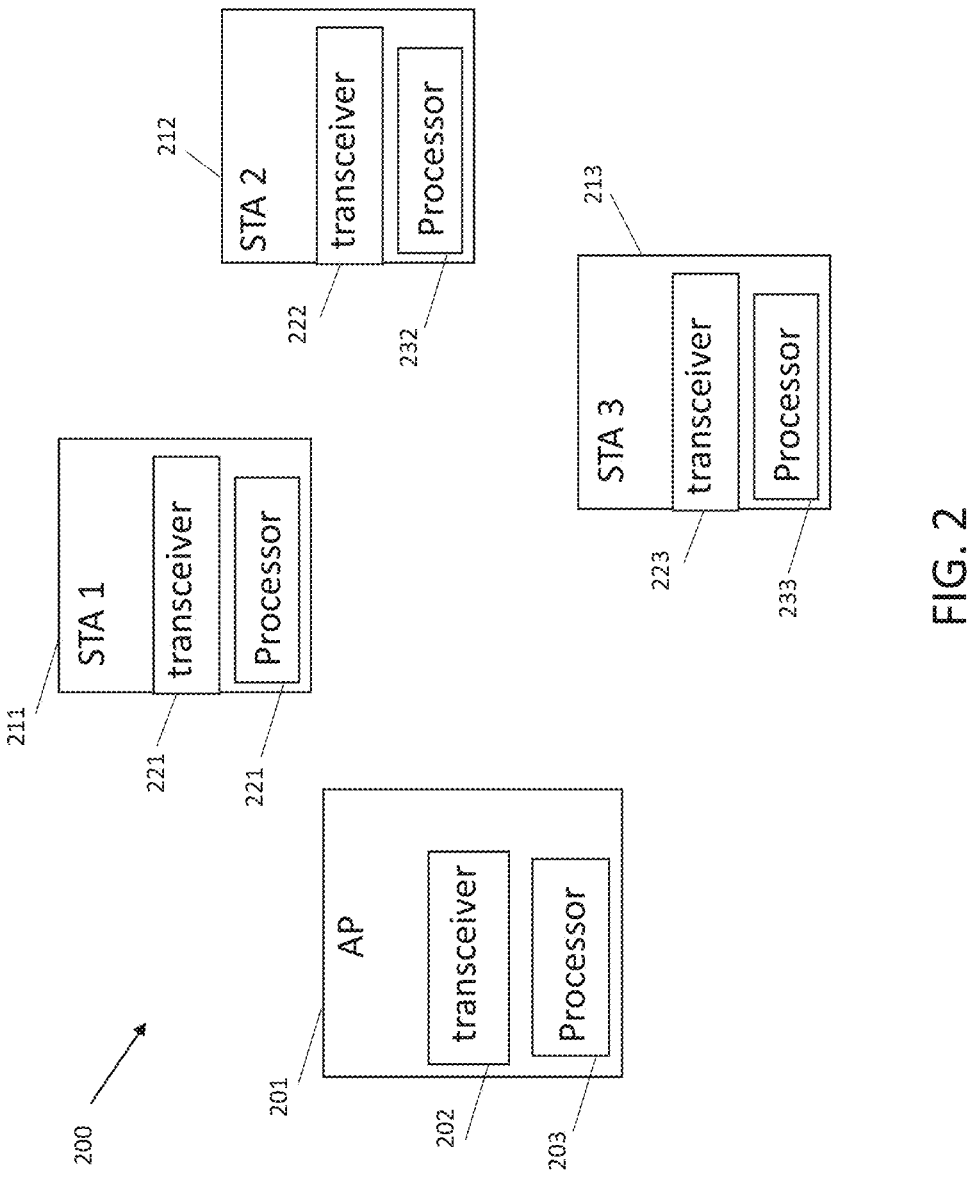
FIG. 2 schematically shows a system for triggering beamforming UL PPDUs, according to some embodiments of the present disclosure.

Reference is now made to FIG. 2, which schematically shows a system for triggering beamforming UL PPDUs, according to some embodiments of the present disclosure. System 200, includes an access point (AP) 201 communication device, which comprises a transceiver 202, for transmitting and receiving data to stations (STAs) STA 1, 211, STA 2, 212 and STA 3, 213. The AP also comprises a processor 203 configured to execute a code for estimating a channel and computing a precoder and to process the data transmitted and received in the AP. The STAs 211, 212 and 213 may be AP STAs or non-AP STAs. Each of the STAs comprises a transceiver 221, 222 and 223 respectively and a processor 231, 232 and 233 respectively.

Figure 3:
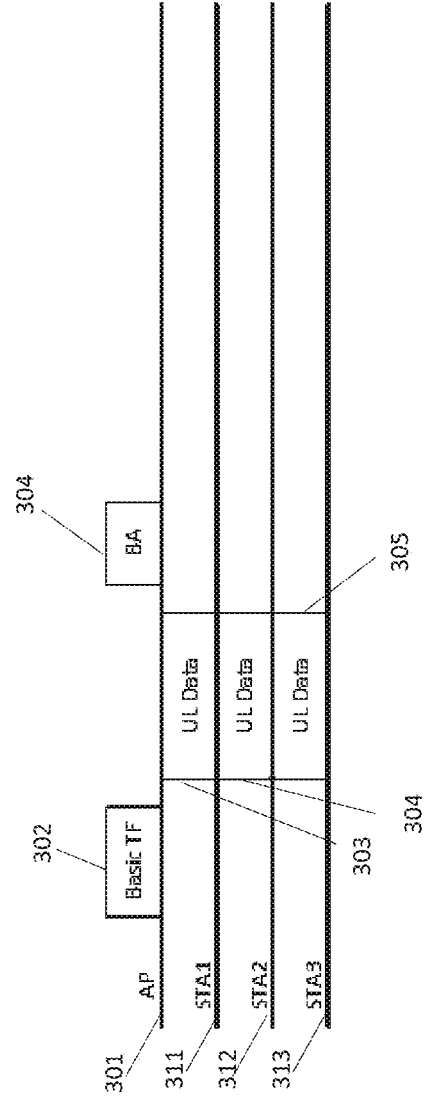
FIG. 3 schematically shows an UL MU-MIMO transmission protocol diagram of a trigger based PPDUs where no beamforming is applied.

Reference is now made to FIG. 3, which schematically shows an UL OFDMA and/or MU-MIMO transmission protocol diagram of a trigger based PPDUs where no beamforming is applied, as supported in IEEE 802.11ax standard. An AP 301 transmits a (basic) trigger frame (TF) 302 simultaneously to STA 311, STA 312 and STA 313. In response, the STAs 311, 312 and 313 transmit simultaneously to the AP one or more UL data packets, where STA 311 transmits UL data packet(s) 303, STA 312 transmits UL data packet(s) 304 and STA 312 transmits UL data packet(s) 305. As mentioned above this protocol does not support UL beamforming, so that the STAs cannot transmit beamformed data and therefore their performances are limited.

According to some embodiments of the present disclosure, triggering the beamforming in the UL is done by an AP communication device comprising a transceiver, which sends a soliciting frame to one or more STAs. The frame contains a null data packet (NDP) request (NDPR) indicator. Each of the one or more solicited STAs sends in response an NDP PPDU to the AP. In some embodiments of the present disclosure the frame comprises an NDPR trigger frame (TF) or an NDPR frame.

Figure 4A:
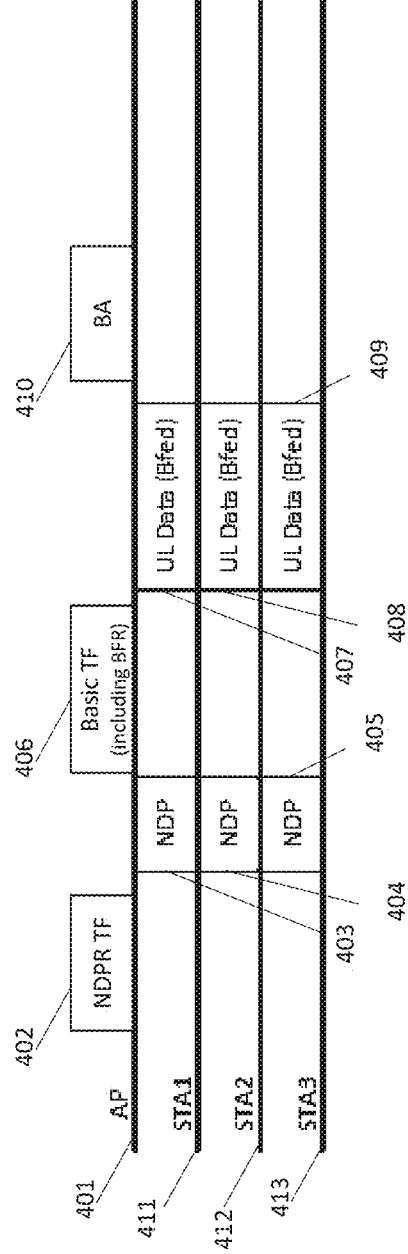
FIG. 4*a* schematically shows an UL transmission protocol diagram of an AP triggering NDP PPDUs by transmitting a soliciting frame which comprises an NDP request (NDPR) trigger frame (TF), according to some embodiments of the present disclosure.

Reference is now made to FIG. 4a, which schematically shows an UL transmission protocol diagram of an AP triggering an NDP PPDU by transmitting a soliciting frame, which comprises an NDP request (NDPR)trigger frame (TF), according to some embodiments of the present disclosure. In some embodiments of the disclosure, AP 401 transmits a soliciting NDPR TF, which includes the required parameters for NDP PPDU transmission by STAs 411, 412 and 413. Each of the solicited STAs 411, 412 and 413 transmits in response an NDP PPDU 403, 404 and 405 respectively. The STAs 411, 412 and 413 transmit the NDP PPDU simultaneously to AP 401. Once the soliciting AP 401 receives the NDP PPDUs from each of the solicited STAs, processor 203 of the AP 401 estimates the channel for each STA and computes the precoder values for each STA. The AP 401 transmits to each of the solicited STAs, a trigger frame PPDU, which requests the STA to transmit data packets in the UL. According to some embodiment of the present disclosure, the trigger frame is a basic trigger frame, which triggers the STAs to transmit data in the uplink. The TF PPDU includes a beamforming report (BFR) which comprises all the details and information for the precoding, so that the STAs perform the beamforming according to the beamforming report. The precoder is computed as a singular vector (or multiple singular vectors) of the channel, quantized and/or compressed into angles using Givens rotations and rotating matrices. The STAs 411, 412 and 414 then transmit an UL transmission of precoded (triggered) PPDUs. Eventually, once the AP 401 receives the precoded (i.e., beamformed) UL data packets, it transmits a block acknowledgement (BACK) to each of the STAs, indicating if the transmission or a subset of the transmission when successfully decoded. According to some embodiments of the present disclosure, when the NDPs are transmitted simultaneously, they are then separated via an orthogonal P-matrix and/or spectrally by the processor 203 of the AP 401. According to some embodiments of the present disclosure, the simultaneous transmission of the NDP PPDU from the STAs, may be extended to include multiple sub-sequences (each containing NDPR TF and NDPs PPDU). This means that the NDPs PPDU may be received from the STAs in portions. For example, in case there are six STAs, an NDPR TF may be sent by the AP to three STAs, and the AP then receives three NDPs PPDU from these three STAs. Then an additional NDPR TF is sent by the AP to the remaining three STAs and the AP receives in response three corresponding NDPs PPDU from the remaining three STAs. Also the transmission of the basic trigger frame, the UL data packets and the BACK may be in portions of multiple sub-sequences (the NDPR indicator, comprising either an NDPR frame or an NDPR TF, may be transmitted once). In other words, the number of sub-sequences for the first NDPR indicator and the basic trigger frame need not be equal (is independent). According to some embodiments of the present disclosure, the AP 401 may transmit the Basic trigger frame and the BFR to a subset of the solicited STAs, where the BFR is contained in the trigger frame soliciting UL data or the BFR is transmitted with the trigger frame soliciting UL data, in a same PPDU.

Figures 4B, 4C:
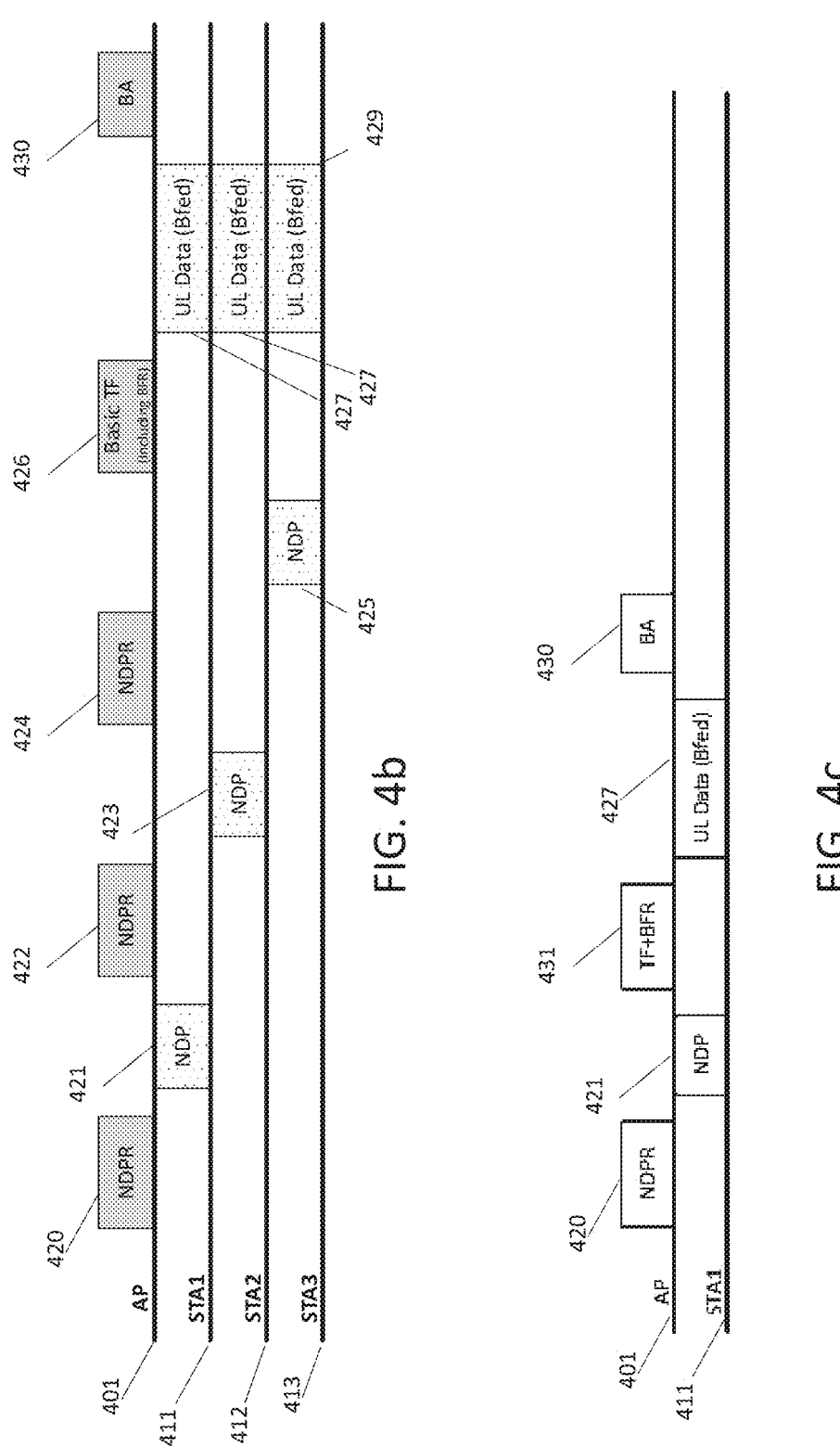
FIG. 4*b* schematically shows an UL transmission protocol diagram of an AP triggering an NDP PPDU by transmitting a soliciting frame comprising an NDP request (NDPR) indicator, where the NDP PPDU is transmitted by the STAs in a sequential manner, according to some embodiments of the present disclosure.
FIG. 4*c* schematically shows an example of a subset of sequential manner transmission where there is only one STA, according to some embodiments of the present disclosure.

Reference is now made to FIG. 4b which schematically shows an UL transmission protocol diagram of an AP triggering an NDP PPDU by transmitting a soliciting NDPR frame to a single STA each time, and the NDP PPDU is transmitted by the solicited STA in response to this NDPR frame. In this case, the AP 401, sends a soliciting NDPR frame to STA 411, which includes the required parameters for sending the NDP PPDU by a STA 411. According to some embodiments of the present disclosure, in the sequential transmission of NDP PPDU from the STAs, the AP 401 transmits an NDPR frame 420 to STA 411 and receives the NDP PPDU 420 in response. The sequential transmission of the NDP PPDU from the other STAs is done by repeating the procedure of transmission of an NDPR frame to another STA and receiving an NDP PPDU transmission in the UL from the solicited STA, for each of the STAs 412 and 413. As can be seen in FIG. 4*b*, STA 411 transmits first NDP PPDU 421, then the AP 401 transmit an NDPR 422, to STA 412, which transmits in response NDP PPDU 423. Then the AP 401 transmit NDPR 424, to STA 413, which transmits in response NDP PPDU 425. Upon the reception of each of the NDP PPDUs by AP 401, the processor of AP 401 estimates the channel for each STA and computes the precoder values for each STA. Then, according to some embodiments of the present disclosure, the AP 401 transmits to all the solicited STAs a trigger frame 426, which initiates an UL data packets transmission and comprises a beamforming report (BFR) for each of the STAs, which comprises beamforming (precoding) weights (amplitude and phase). The STAs then, according to some embodiments of the present disclosure, perform the beamforming according to the BFR values and transmit the beamformed UL data packets to the soliciting AP 401 simultaneously. The AP 401, transmits in response to the solicited STAs a block acknowledgement (BA or BACK), which indicates the successful receipt of the UL beamformed data packet(s) or portions thereof. According to some embodiments of the present disclosure, the sequential transmission of NDP PPDU from the STAs is performed for example, in case of large received power variation between STAs.

According to some embodiments of the present disclosure, the simultaneous NDP PPDUs received from the solicited STAs is carried out using a multiplexing of UL orthogonal frequency division multiplexing access (OFDMA), or UL multi user multiple input multiple output (MU-MIMO), or a combination of OFDMA and MU-MIMO.

According to some embodiments of the present disclosure, the BFR contained in the TF may comprise a narrowband (NB) precoding values or wideband (WB) precoding values. Narrowband precoding means a precoding values per-tone (subcarrier) or small group of tones (e.g. 4, 16 tones using an IEEE 802.11ax standard tone-plan). Wideband precoding means a single precoder values for the entire bandwidth or for a large number of tones (e.g. all tones, 242 tones, and the like).

Reference is now made to FIG. 4*c*, which schematically shows an example of a subset of sequential manner transmission (shown in FIG. 4*b*), where there is only one STA, according to some embodiments of the present disclosure.

In this example AP 401 transmits a soliciting frame comprising an NDPR frame 420 to STA 411, which transmits in response an NDP PPDU 421 to the AP 401. The AP then estimates the channel for STA 411 and computes the precoder based on the transmitted NDP, and then the AP 401 transmits a trigger frame soliciting UL data and a BFR 431, which are transmitted in a same PPDU. According to some other embodiments of the present disclosure, the AP 401 may transmit the BFR contained in the trigger frame soliciting UL data 431.

According to some other embodiments of the present disclosure, the UL data packets received from the subset of the solicited STAs, comprise an indication signal which indicates that the one or more UL data packets are beamformed. In some other embodiments of the present disclosure the AP 401 is not able to decode the preamble of the UL data packets transmitted by the subset of the solicited STAs, and to decode the indication signal which indicates that the one or more UL data packets are beamformed. In this case the AP 401 assumes the UL data packets received from the subset of the solicited STAs are beamformed and/or precoded.

Figure 5A:
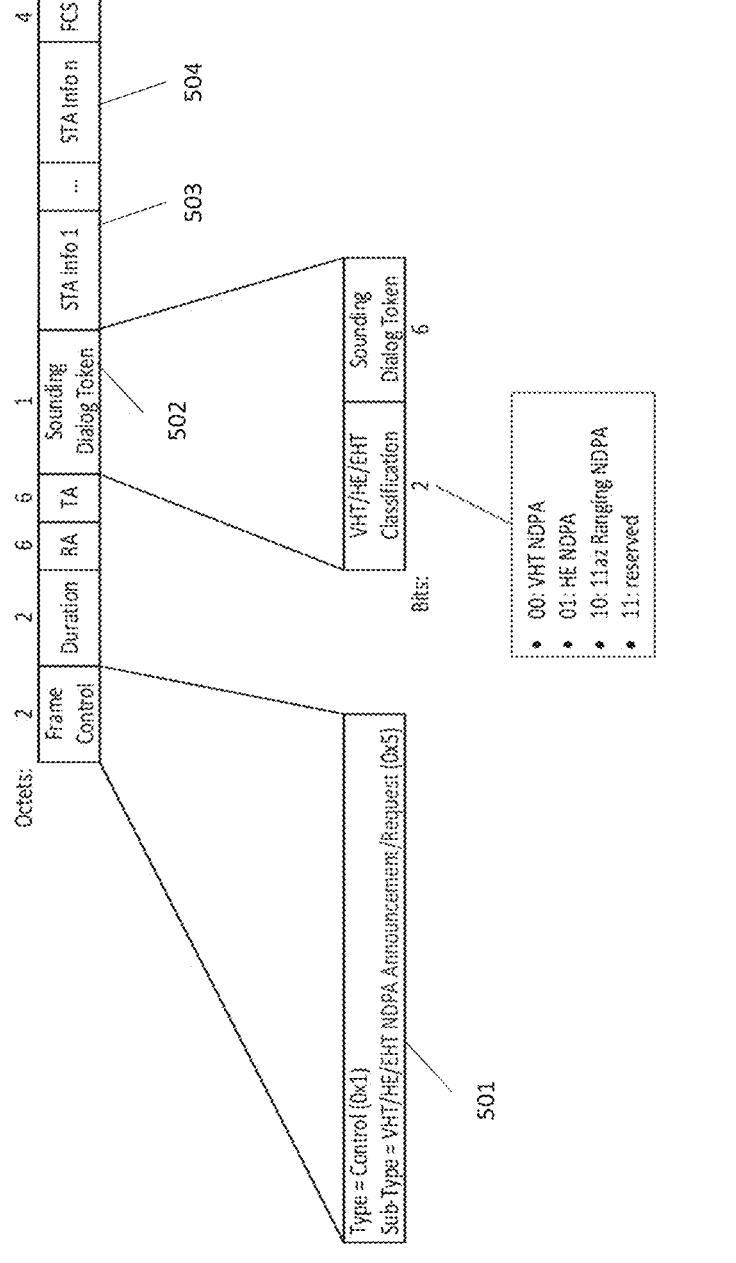
FIG. 5*a* schematically shows an example of an NDPR frame format, according to some embodiments of the present disclosure.

Reference is now made to FIG. 5*a*, which schematically shows an example of an NDPR frame format, according to some embodiments of the present disclosure. This frame format is built upon an existing field used in 802.11ac (very high throughput (VHT)), 802.11ax (high efficiency (HE)) and 802.11az, with modifications described hereon. Furthermore, the same frame format may be used for both NDPA and NDPR, the differentiation determined according to the sub-fields described hereon. In this example the fields of sub-type 501, Sounding Dialog Token 502 and STA Info field 503 and 504 are used for disambiguation between VHT, HE and 802.11be extremely high throughput (EHT) formats. In case of an NDPR frame, the frame shall include only a single STA Info field 503, and the NDPR frame is used to solicit an NDP PPDU from a single STA, as depicted for example, in FIG. 4*b*. The NDPR frame is a unicast frame, and the receiver address (RA) sub-field includes the MAC address of the intended STA.

FIG. 5*b* schematically shows a table, which describes the size and value for the fields of NDPR, BW, Nr and AID in the STA Info field, according to some embodiments of the present disclosure. The STA Info fields within the NDPR includes at least the following fields: the NDPR bit is used to distinguish between an EHT NDPA frame and an EHT NDPR frame; 3 bits are used to signal the BW of the NDP PPDU, from 20 MHz to 320 MHz; 4 bits are used to signal the number of space-time streams (equivalently, EHT-LTF symbols) to transmit; ii bits for the AID; at least 1 bit for disambiguity between VHT, HE and EHT frame formats.

FIGS. 5*c*1-5*c*3 schematically shows disambiguation options for the sounding dialog field, according to some embodiments of the present disclosure.

Figure 6:
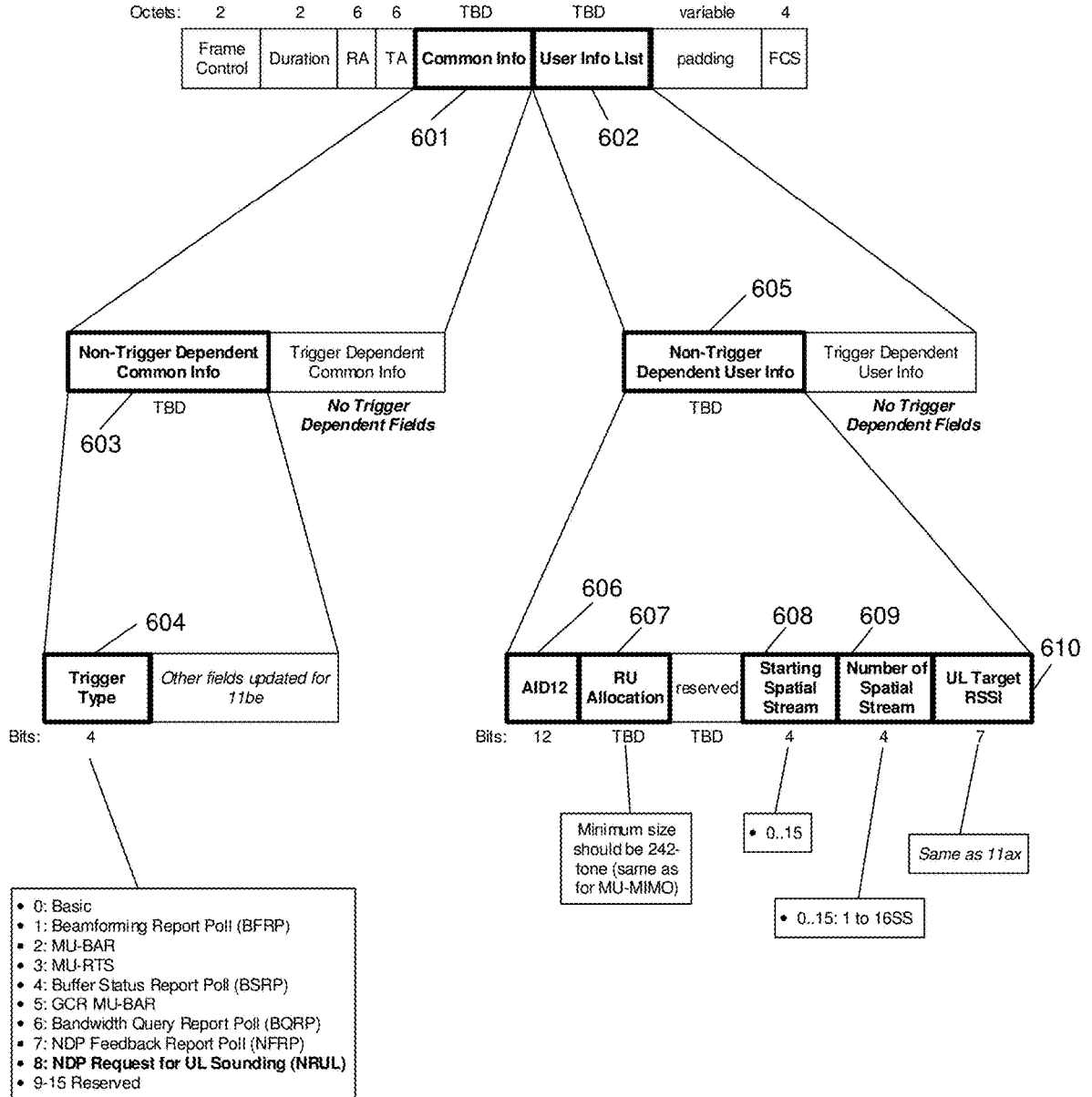
FIG. 6 schematically shows an example for an NDPR trigger frame format, according to some embodiments of the present disclosure.

Reference is now made to FIG. 6, which schematically shows an example for a trigger frame format, according to some embodiments of the present disclosure. Fields 601 and 602 of the common info and the STA info, are adapted to accommodate the future 802.11be standard. Bolded fields 601-610 show where there are changes in the 802.11be trigger frame format (relative to 802.11ax). For initiating the NDP PPDUs from one or more STAs, according to some embodiments of the present disclosure, a new Trigger Type (value 8) is introduced. For supporting beamformed UL data packets, according to some embodiments of the present disclosure an resource unit (RU) allocation is limited to a minimum size of 242-tones.

Figure 7:
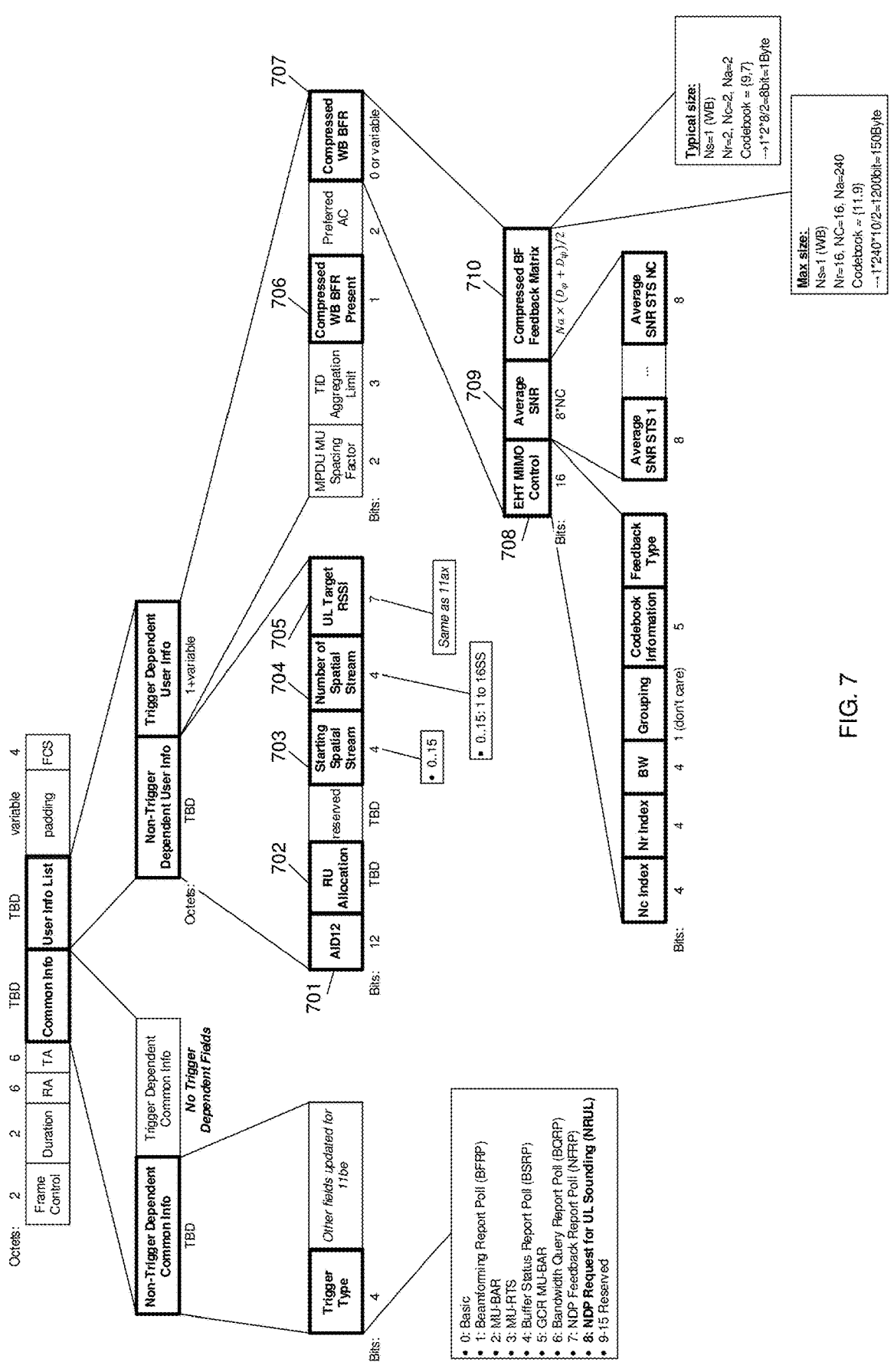
FIG. 7 schematically shows an example for basic trigger frame format, according to some embodiments of the present disclosure.

Reference is now made to FIG. 7, which schematically shows an example for basic trigger frame format, according to some embodiments of the present disclosure. Bolded fields 701-710 show where there are changes in the 802.11be. For supporting UL beamforming, according to some embodiments of the present disclosure, the basic trigger frame comprises a new bit called 'Compressed BFR Present'. Also—the compressed NB and/or WB BFR is optionally included within the Basic TF.

According to some embodiments of the present disclosure, the WB BFR is given in resolution of 20 MHz (different WB precoder values for every 20 MHz). This can maintain sufficient performance for wide BW, while keeping precoding overhead to a minimum. In order to support this, the 'Grouping' bit is now defined as: 0: Ng=Infinity (wideband for the entire BW); 1: Ng=242 (wideband precoding for every 242-tone RU).

Figure 8:
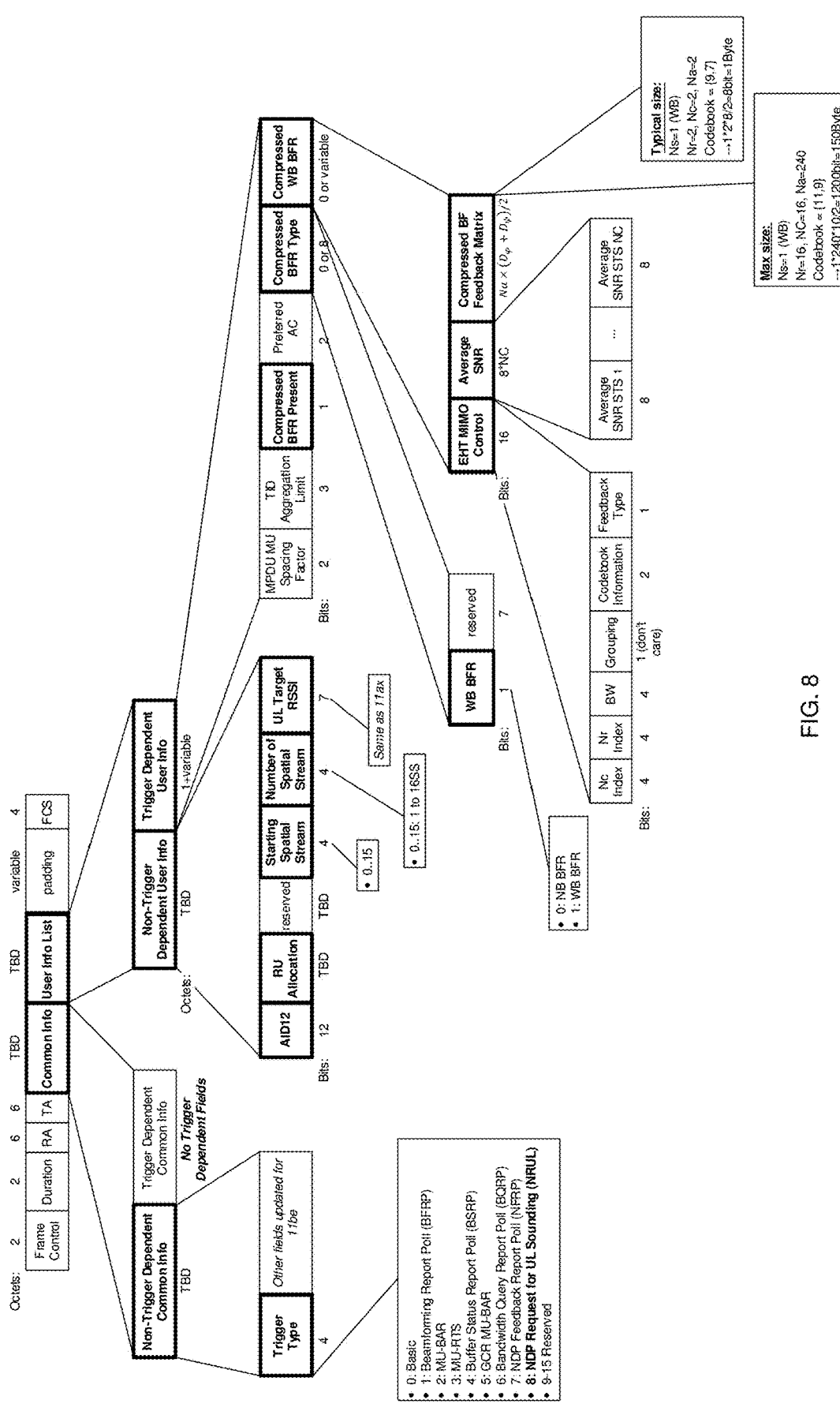
FIG. 8 schematically shows an example for two options of the BFR: NB and WB, according to some embodiments of the present disclosure.

FIG. 8 schematically shows an example for two options of the BFR: NB and WB, according to some embodiments of the present disclosure.

According to some embodiments of the present disclosure, NB BFR may be very long, hence the BFR contents are carried in a separate frame(s), so there is aggregation of Trigger Frame and NB BFR frame(s).

FIG. 9 schematically shows a table, which presents how the values of the sub-fields, according to some embodiments of the present disclosure ('Compressed BFR present', 'Compressed BFR type') indicate the existence of the WB or NB BFR and whether it is aggregated with the Trigger Frame.

Reference is now made to FIG. 10, which schematically shows a method for triggering beamformed UL PPDUs, according to some embodiments of the present disclosure.

At 1001, an AP sends a soliciting frame to one or more STAs or to a subset of the one or more STAs. The frame comprises an NDPR indicator. According to some embodiments of the present disclosure, the soliciting frame may comprise an NDPR TF or an NDPR frame.

At 1002, the AP receives from each of the one or more solicited STAs or from the subset of the one or more solicited STAs, an NDP PPDU in response to the soliciting frame with the NDPR indicator. According to some embodiments of the present disclosure. In case of an NDPR TF the transmission may be simultaneously to the one or more solicited STAs, and then the NDP PPDU from the one or more solicited STAs may be transmitted simultaneously. In another case an NDPR frame is transmitted from the AP to a single STA, so that the transmission is per a single STA at a time, and then the NDP PPDU is transmitted from the solicited STA each time. The procedure of transmission of an NDPR frame to a single STA and then a reception of an NDP PPDU from that STA may be repeated for the whole one or more STAs.

At 1003, the AP estimates the channel parameters for each of the one or more solicited STAs or for the subset of the one or more solicited STAs, and computes a precoder for each of the one or more solicited STAs, or for the subset of the one or more solicited STAs respectively. At 1004, the AP sends a trigger frame to solicit UL Data packets transmission with a beamforming report (BFR) to the one or more solicited STAs or to the subset of the one or more solicited STAs. The BFR comprises the information for the one or more solicited STAs (or for the subset of the one or more solicited STAs), of how to set their precoders in order to perform the beamforming.

According to some embodiments of the present disclosure the trigger frame contain the BFR if its type is of Wide-Band (WB) BFR. According to some other embodiments, the BFR is transmitted with the trigger frame in a same PPDU, such that both are aggregated, if its type is of Narrow-Band (NB) BFR.

At 1005, the AP receives from the one or more solicited STAs or from the subset of the one or more solicited STAs, one or more beamformed UL data packets. Eventually, at 1006, the AP sends a BACK to each of the one or more solicited STAs or the subset of the one or more solicited STAs, indicating the one or more UL data packets, or portions thereof, have been successfully decoded.

Figure 11:
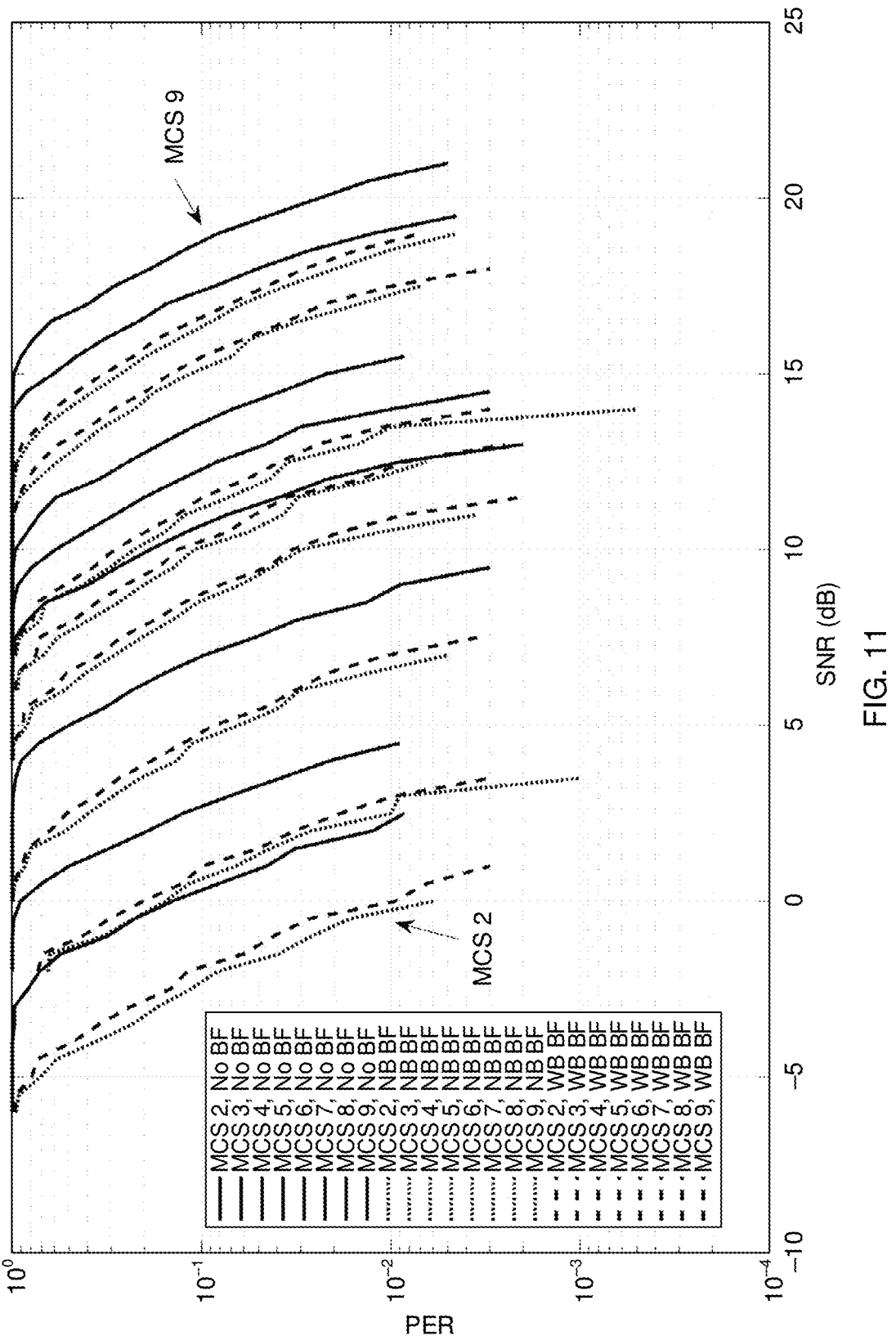
FIG. 11 schematically shows results of a simulation of the link-level packet error rate (PER) as a function of the Signal to Noise Ratio (SNR) for various modulation and coding scheme (MCS) values and for no precoding (no beamforming), WB and NB precoding, according to some embodiments of the present disclosure.

Reference is now made to FIG. 11 which schematically shows results of a simulation of the link-level packet error rate (PER) as a function of the Signal to Noise Ratio (SNR) for various modulation and coding scheme (MCS) values and for no precoding (no beamforming (no BF)), wideband and narrowband precoding, according to some embodiments of the present disclosure.

The link level and the system level were simulated to show the benefits of the system and method disclosed in the present disclosure. For the simulations, it was assumed as follows: (a) 4 STAs, each with 2 transmitter (Tx) antennas; (b) AP with 8 receiver (Rx) antennas; (c) 20 MHz BW, 242-tone RU, (d) a single spatial-stream is transmitted by each STA, option #1 (joint NDP); (e) 16 usec symbol duration with following durations: TF/TF (incl. NDP-A)—40 usec, PHY NDP—60 usec, ACK—50 usec, TF (containing NB BFR)—92 usec (assuming MCS 3, Ng=4, 2 angles per tone), TF (containing WB BFR)—28 usec, Data PPDU—60 usec (preamble)+1000B data (depending on MCS).

It can be seen from FIG. 11 that the PER for the NB and WB MCS is lower for a given SNR when compared with the no BF case.

Figure 12:
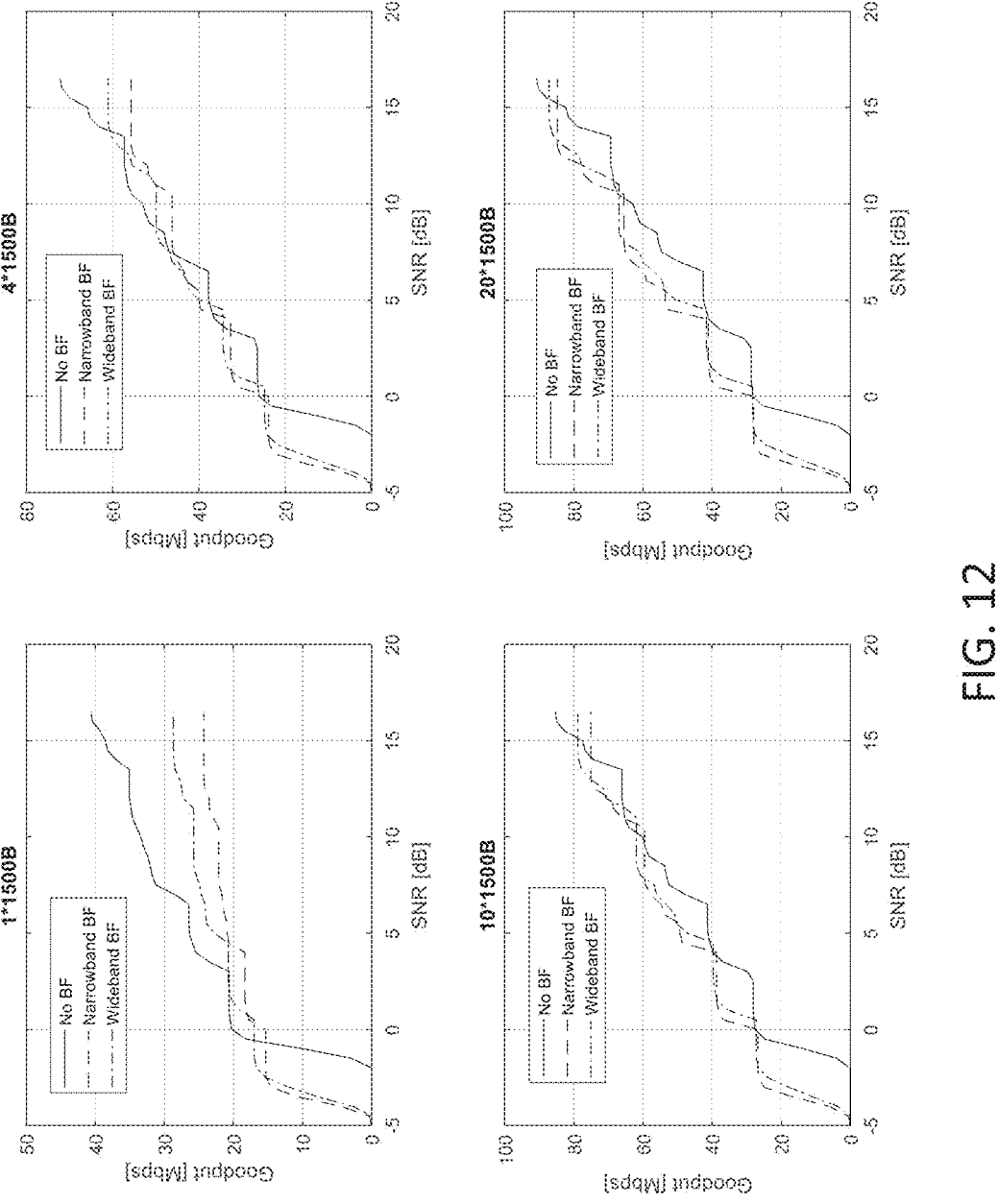
FIG. 12 schematically shows results of a simulation where the goodput for all three schemes (No beamforming, NB precoding and WB precoding) was computed, for several different payload sizes, according to some embodiments of the present disclosure.

FIG. 12 schematically shows results of a simulation where the goodput for all three schemes (No beamforming, NB precoding and WB precoding) was computed, for several different payload sizes, according to some embodiments of the present disclosure. Both beamforming schemes yield higher goodput than the no BF case, above a certain payload (or aggregation) size. The gap between NB and WB beamforming is very small. The advantage of using WB precoding is the applicability for inclusion in a TF due to its small size. It seems that the wideband precoder is very useful for the following reasons. As shown in both link-level and goodput results, the wideband precoder yields results similar to those of the narrowband precoder (sometimes even better results, due to the lower overhead). The wideband precoder may be easily incorporated into the Trigger Frame—no need for frame aggregation (so when the TF is successfully decoded, so is the BFR). For a 2Tx antenna transmission, 2 angles are needed (~2 Bytes), hence no aggregation is required. Assuming eigenvector decomposition of an N×N matrix requires ~12.5*N^+6*N^2 Complex Multiplications (CM), similar to a singular vector decomposition (SVD), and covariance matrix calculation requires ~0.5*N^3 CMs, this is the corresponding complexity at the AP for a single STA (so no additional HW is required at AP), as can be seen in the table of FIG. 13 which schematically shows the complex multiplication of NB and WB beamforming for specific scenario according to the number of Tx antennas, BW and number of tones.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and systems for triggering beamforming up link (UL) physical layer protocol data units (PPDUS), will be developed and the scope of the term triggering beamforming UL PPDUs is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to embodiments. To the extent that section headings are used, they should not be construed as necessarily limiting.

What is claimed is:

1. An access point (AP) communication device comprising:
   a transceiver, the transceiver being configured to:
   send a null data packet request (NDPR) trigger frame (TF) to one or more stations (STAs), wherein the NDPR TF comprises an NDPR indicator that is configured to initiate sending of an uplink NDP physical protocol data unit (PPDU) from the one or more STAs; and
   receive an NDP PPDU from each of the one or more solicited STAs.

2. The AP communication device according to claim 1, wherein the NDP PPDU received from the one or more STAs comprises one of multiplexing of:
   uplink (UL) orthogonal frequency division multiplexing access (OFDMA),
   UL multi user multiple input multiple output (MU-MIMO), or
   a combination of OFDMA and MU-MIMO.

3. The AP communication device according to claim 1, further comprising at least one processor and a memory storing instructions to be executed by the at least one processor, the at least one processor when executing the instructions being configured to:
   compute a precoder for an uplink (UL) data packet transmission based on the received NDP PPDU(s) from the one or more STAs.

4. The AP communication device according to claim 1, wherein the transceiver is further configured to:
   transmit a beamforming report to the one or more STAs, or a subset of the one or more STAs, wherein the beamforming report is contained in a second trigger frame soliciting UL data or the beamforming report is transmitted with the trigger frame soliciting UL data, in a same PPDU.

5. The AP communication device according to claim 4, wherein the transceiver is further configured to:
   receive from each of the one or more STAs, or a subset of the one or more STAs, UL data packets which are beamformed according to the beamforming report.

6. The AP communication device according to claim 5, wherein one or more UL data packets received from the one or more STAs, or the subset of one or more STAs, comprise an indication signal which indicates that the one or more UL data packets are beamformed.

7. The AP communication device according to claim 4, wherein the beamforming report comprises narrowband and/or wideband precoding.

8. The AP communication device according to claim 7, wherein the beamforming report comprises a minimum size of resource allocation of 242 tones for wideband precoding, to support UL beamforming.

9. The AP communication device according to claim 4, wherein the beamforming report comprises a compressed narrowband beamforming report bit and/or a compressed wideband beamforming report bit.

10. The AP communication device according to claim 4, wherein the beamforming report is given in a resolution of 20 MHz.

11. The AP communication device according to claim 1, wherein the transceiver is further configured to:

send a block acknowledgement (BACK) to the one or more STAs, or the subset of one or more STAs in response to receiving the UL data packets which are beamformed from the one or more STAs, or a subset of one or more STAs.

12. The AP communication device of claim 1, wherein the transceiver is further configured to:

send an NDPR which comprises a sub type field and a STA Info field which comprise information that enables disambiguation between frame formats of very high throughput (VHT), high efficiency (HE) and extremely high throughput (EHT).

13. The AP communication device according to claim 1, wherein the NDPR indicator is a value corresponding to an NDP request for UL Sounding (NRUL).

14. A station (STA) comprising:

a transceiver, the transceiver being configured to:

receive a null data packet request (NDPR) trigger frame (TF) from an access point (AP), wherein the NDPR TF comprises an NDPR indicator that is configured to initiate sending of an uplink NDP physical protocol data unit (PPDU) from one or more STAs; and send an NDP PPDU to the AP.

15. The STA according to claim 14, wherein the NDP PPDU comprises one of multiplexing of:

uplink (UL) orthogonal frequency division multiplexing access (OFDMA),

UL multi user multiple input multiple output (MU-MIMO), or a combination of OFDMA and MU-MIMO.

16. The STA according to claim 14, wherein the transceiver is further configured to:

receive a precoder for an uplink (UL) data packet transmission computed by the AP based on the NDP PPDU.

17. The STA according to claim 14, wherein the transceiver is further configured to:

receive a beamforming report from the AP, wherein the beamforming report is contained in a second trigger frame (TF) soliciting UL data or the beamforming report is transmitted with the TF soliciting UL data, in a same PPDU.

18. The STA according to claim 17, wherein the transceiver is further configured to:

send UL data packets to the AP, which are beamformed according to the beamforming report, in response to the TF soliciting UL data.

19. The STA according to claim 17, wherein the beamforming report comprises a compressed narrowband beamforming report bit and/or a compressed wideband beamforming report bit.

20. The STA according to claim 14, wherein the NDPR indicator is a value corresponding to an NDP request for UL Sounding (NRUL).

* * * * *